United States Patent [19]

Saita et al.

[11] Patent Number: 4,847,103

[45] Date of Patent: Jul. 11, 1989

[54] PROCESS FOR PRODUCING PREGELATINIZED GRAIN

[75] Inventors: Eiichi Saita; Shigetaka Mori, both of Kanagawa; Akihiko Mori, Tokyo, all of Japan

[73] Assignees: Eiichi Saita; Nippon Scitec Co., Ltd., both of Yokohama, Japan

[21] Appl. No.: 22,880

[22] Filed: Mar. 6, 1987

[30] Foreign Application Priority Data

Mar. 7, 1986 [JP] Japan ................... 61-50204

[51] Int. Cl.$^4$ .............................. A23L 1/18
[52] U.S. Cl. ................... 426/445; 426/447; 426/448; 426/457; 426/460; 426/507; 426/621
[58] Field of Search ............ 426/457, 445, 447, 448, 426/460, 621, 507

[56] References Cited

U.S. PATENT DOCUMENTS

| | | | |
|---|---|---|---|
| 1,933,158 | 10/1933 | Bohn et al. | 426/621 |
| 1,989,480 | 1/1935 | Kellogg | 426/621 |
| 2,064,701 | 12/1936 | Stokkebye | 426/457 |
| 2,653,099 | 9/1953 | Carman et al. | 426/621 |
| 2,653,101 | 9/1953 | Carman et al. | 426/621 |
| 3,062,657 | 11/1962 | Vollink | 426/466 |
| 3,117,006 | 1/1964 | Wenger | 426/448 |
| 3,318,705 | 5/1967 | Clausi et al. | 426/621 |
| 3,342,607 | 9/1967 | Hickey | 426/462 |
| 3,528,815 | 9/1970 | Trotter | 426/457 |

OTHER PUBLICATIONS

Mottern et al., Food Technology, vol. 23, Cooking-Extrusion-Expansion of Rice; 1969, pp. 169-171.

*Primary Examiner*—Donald E. Czaja
*Assistant Examiner*—Mary S. Mims
*Attorney, Agent, or Firm*—Fleit, Jacobson, Cohn, Price, Holman & Stern

[57] ABSTRACT

The present invention relates to a process for producing gelatinized grain for food or food processing material without steaming or boiling. The present invention comprises adjusting the water content of the grain before puffing to 40% or less, puffing the grain at 100° C., further adding water to the puffed grain, and then coarsely pulverizing the grain, thereby producing coarsely pulverized porous grain. According to the present invention, the coarsely pulverized porous grain having a good crispness as well as a homogeneous water absorption and easy handling, can be obtained.

6 Claims, No Drawings

PROCESS FOR PRODUCING PREGELATINIZED GRAIN

FIELD OF THE INVENTION

The present invention relates to a process for producing pregelatinized grain without steaming or boiling.

PRIOR ART

Conventionally, grain is used for food or food processing material by gelatinizing or pregelatinizing the grain starch using boiling or steaming. On the other hand, in order to conduct the gelatinization without the boiling or the steaming, techniques of previously pregelatinizing the grain have been employed since very old times. For example, as previously gelatinized products, dried boiled rice and rice cakes can be cited. Recently, there is sold various pregelatinized food as produced from various processes such as products called pregelatinized rice, precooked rice, instant rice, etc.

As a pregelatinization process, there are various processes such as those wherein the grain is heated using the infrared rays, wherein the grain is previously boiled and then the resultant material is packaged under vacuum, and wherein the puffing treatment is employed. Among them, the process using the puffing treatment is advantageous because the resultant material is stable in gelatinized state, good solubility in water, easily digested with an enzyme, and flowable at normal temperature.

As a process for puffing the grain, there have been known various industrial puffing processes such as a home puffing process wherein the grain is heated in fats and oils or on a frying pan, a puffing gun process wherein the grain is heated under pressure in a closed vessel and then is released to an atmosphere at normal tempreature and under normal pressure, a wet process using fats and oils as a heating medium, a dry process using a very hot medium, etc. Recently, a puffing process wherein the grain is puffed by successively extruding it from conditions of high temperature and high pressure according to extrusion puffing, is also known. Among these puffing processes, the extrusion puffing process is most effective in puffing and provides higher degree of gelatinization. As grain to be used for these processes, any kind of grain can be used. In this case, grits have often been used as feet material in order to provide suitable taste.

However, any of the puffed material as produced by the above processes is low in its bulk density, although it is porous and has a considerable degree of gelatinization. Thus, there are several defects in that the puffed material requires much space for its storage; that it takes much time to make the material absorb water since it absorbs water from its surface little by little; and that it becomes sticky while it absorbs water, so that it is difficult to handle the material. Further, since its bulk density is low, it rises and floats on the surface of water when the material is put into water in order to dissolve it in water, so that it takes much time to dissolve the material and the stirring thereof is difficult.

In order to remove these drawbacks, it can be proposed to coarsely pulverize ( crush ) the puff in order to reduce its bulkiness. However, grain having a low protein content such as rice is ready to become fine powder, so that it is not able to collect pulverized grain of suitable size ( flake or grits ). When the fine powder is dissolved in water, it floats on the surface of water and is apt to aggregate, so that its swelling due to water asborption is heterogeneous and it takes much time to dissolve the powder.

On the other hand, light crispy gelatinized food has been commercially available from old times. The food is generally prepared by dissolving the grain powder in water, thinly spreading it on a heated plate to heat and dry the powder so that the powder is slightly roasted, peeling it from the plate, and then coarsely pulverizing it to form flake-like material. Industrially, they are prepared by steaming or boiling grain grits, adjusting the water content to 20% or so, rolling it by a pressure roll, and then roasting and drying it by a drum dryer, etc. However, the flakes as produced by these processes are not generally porous.

Thus, they are not much less fluffy, and their texture as food is not always good because, for example, the flakes become too soft when they are put into milk. On the other hand, the puffed grain is porous and the food texture is hard, and therefore its crispness is sufficient, but it is difficult to handle the puffed grain as stated in the above.

SUMMARY OF THE INVENTION

An object of the present invention is to provide a new process for producing pregelatinized grain without steaming or boiling.

Another object of the present invention is to provide a process for producing food or food processing material which can be sufficiently gelatinized, has a taste of crispness while it is maintained porous, has a uniform absorption swelling, it not difficult to aggregate, and has a high solubility in water.

In order to accomplish the above objects, the present inventors have made intensive studies and, as a result, the present invention has been invented.

This invention is a process for producing food or food processing feed material comprising puffing grain, characterized by adjusting the water content of the material before the puffing to 40% or less, puffing the material at 100° C. or above, adding a prescribed amount of water to the puffed material, and then coarsely pulverizing the puffed material, to convert the puffed material into crushed material ( flake or grits ) which is maintained porous.

DETAILED DESCRIPTION OF THE INVENTION

The present invention will be further explained in detail below.

In the present invention, any kind of edible grain can be used. The grain includes rice (polished or unpolished rice), barley, wheat, rye, oat, foxtail millet, a Deccan grass, adlay, koaliang, corn, etc. The term "puffing" used in this specification means that the feed material is rapidly heated to cause the water content of the feed material to expand and release from the material, so as to form hollow pores ( to be porous ), increase its volume, and harden the tissue ( to be crisp ). The puffing process to be used in the present invention can include any of the conventionally known processes such as the wet process, dry process, puffing gun process, extrusion puffing process, etc. Among them, the extrusion puffing process provides high expansivity and crispness. Further, the degree of the puffing of the extrusion puffed material is 90 % or higher, and its water content is low.

The term "crushed material" used in this specification means processed material in a form of flake or grits. Its dimension is not limited, but it is preferable that the crushed material is 0.1 to 0.5 cm in length and 0.5 cm or less in thickness. The crushed material required in the present invention must have a small thickness or graininess, a high degree of gelatinization, and a good solubility in water.

In the process of the study for producing the pregelatinized material which has merits of both the puffed material having good crispness but heterogeneous water absorption and being difficult to handle, and the flake having homogeneous water absorption and being easy to handle but having bad crispness and texture, various attempts were made. Firstly, the puffed material was coarsely pulverized. However, fine powder was obtained. Further, when the powder was introduced into water, it easily aggregated, and therefore it was much more difficult to handle than the puffed material before the coarse pulverization. Secondly, the water content of the grain before the puffing treatment was adjusted and then the grain was coarsely pulverized. However, the grain as obtained was fine powder. Thirdly, when water was added to the puffed grain to adjust the water content thereof and then the grain was coarsely pulverized, little large particles were obtained. Lastly, water was added to the grain before the puffing treatment in order to adjust the water content of the grain, the water content of the puffed grain was adjusted by adding water to the puffed grain, and then the puffed grain was coarsely pulverized. As a result, the particles in a flake or grits form were obtained.

From the above attempts, the following knowledge was obtained. When the water content of the grain before the puffing treatment is higher, hard puffed grain having a lower degree of puffing is obtained. When the water content thereof is lower, brittle puffed grain having a higher degree of puffing is obtained. The degree of gelatinization correlates to the degree of puffing. Namely, the higher the water content is, the lower the degree of gelatinization is. The lower the water content is, the higher the degree of gelatinization is. On the other hand, the higher the water content is, the higher the crispness is. The lower the water content is, the lower the crispness is. Furthermore, it was found that a flakiness related to the water content of the grain before pulverization. This reason seems to be that water contained in the grain gives adhesion to the tissue which easily separates into pieces without water, so that the grain is maintained in a flake or grits form. In this connection, when the water content is too large, the adhesion is too strong and therefore the crispness is lost and the texture is deteriorated. Therefore, it has been found out that the water content of the grain before puffing has a very big effect on the degree of puffing and degree of gelatinization, while the water content of the grain before pulverization has a very big effect on the flakiness and crispness. Based on this knowledge, the present invention has been completed.

Any of processes of adding water to the grain before puffing can be employed so long as water is uniformly spread over the grain, and it is required that the grain is left to stand or subjected to other suitable treatment until water is sufficiently absorbed so that water does not remain on the surface of the grain. However, a process of immersing the grain in water and then draining off water is not desirable because there is a possibility that the amount of water to be absorbed is beyond the optimum range. A process of immersing the puffed grain in water and then draining off water is not preferable for adjusting the water content of the puffed grain before pulverization, either. In this case, since the grain is puffed and therefore is readily water-absorbable, it is necessary to be cautious so that the water content is not locally high in particular. When the amount of water to be added is low, the grain may be made to absorb water merely by passing it through a steam tunnel.

Any kind of puffing processes can be employed. The continuous extrusion puffing process using a extrusion puffing machine, extruder, wherein a high temperature of 100° C. or above and a high pressure are employed is desirable, because it provides high degree of puffing and high degree of gelatinization.

The puffed grain is generally subjected to the second adjustment of water content while it is hot, and then coarsely pulverized. It is preferable that the amount of water to be added to the puffed grain be 15 % or lower.

The coarse pulverization ( crushing ) may be conducted just after the water content adjustment, or after it has been left to stand for 1 or 2 hours. Any kind of processes for coarse pulverization may be used so long as they can crush the grain into flakes or grits. The flakers used for producing bread crumb are convenient.

The crushed material in a flake or grits form is dried as it is, and then packaged in a case. Since the water content of the product is 40% or lower, there is little possibility that the product is contaminated with microorganisms such as fungi, etc., even though it is left to stand at normal temperature. However, since the product is vey hygroscopic, it is necessary to store the product so that the product does not contact with humidity.

ADVANTAGE OF THE PRESENT INVENTION

The puffed and crushed grain obtained by the present invention has a very high degree of gelatinization of 90 %, and therefore it is saccharified rapidly and practically completely with a saccharifying enzyme. In addition, the present crushed grain has a degree of puffing 3 times as high as the prior grain, is porous, and has a high air content, so that, when the grain is suspended in water, the grain does not aggregate due to its wide surface contacting with water and is uniformly dispersed. Further, since the air content of the grain is not too much high dislike the grain before crushing, the grain precipitates in water without floating and swelling on the surface of water. Further, the water absorption rate of the grain is equal in all parts, so that the grain absorbs water rapidly and uniformly. In addition, when the present grain is used as feed material for brewage such as sake, vinegar, soy sauce, miso, etc., there yield little less. Therefore, the degree of utilization of the material is high. Further, according to the present invention, even rice lacking maturity ( so-called "shiratamai") can be also used by no means inferior to matured rice.

When the present flake is used for food, it has high crispness because the puffed grain is suitably roasted at the puffing. Therefore, when the grain is introduced into mil, etc. to eat the grain in a so-called oatmeal milk style, the taste is good ( the food is not sloppy ). In view of the above, the present invention compensates the demerits of both the difficulty in handling of the puffed grain and the low crispness of the conventional flakes, and further produces new crushed grain having merits such as a porosity, crispness, dispersion of flakes, and unadhesiveness.

EXAMPLE

The present invention will be explained in detail below with reference to Examples.

REFERENCE EXAMPLE

19 Kg of polished rice was separated into portions each of 1 Kg, water was added to each portion as described in the following Table 1, and then the portion was extruded by a single screw extruder to puff the rice. Water was added to each puffed portion as indicated in Table 1, and the resultant material was coarsely pulverized by a flaker. In the table, the specific volume, degree of gelatinization, crispness, dispersion, and equality of water absorbency of each of the coarsely pulverized materials are listed.

TABLE 1

Relation between Property of the Coarsely Pulverized Porous Material and Water Content Adjustment

| | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Water content of feed rice (%) | | 14 | 14 | 14 | 14 | 14 | 14 | 14 | 14 | 14 | 14 | 14 | 14 | 14 | 14 | 14 | 14 | 14 | 14 | 14 |
| Amount of water added (%) | | 0 | 0 | 5 | 5 | 5 | 5 | 8 | 8 | 8 | 13 | 13 | 13 | 18 | 18 | 18 | 24 | 24 | 28 | 28 |
| Water content just after the puffing (%) | | 7 | 7 | 12 | 12 | 12 | 12 | 15 | 15 | 15 | 20 | 20 | 20 | 25 | 25 | 25 | 31 | 31 | 37 | 37 |
| Humidity added (%) | | 0 | 10 | 0 | 5 | 10 | 15 | 0 | 10 | 15 | 0 | 10 | 15 | 0 | 10 | 15 | 0 | 10 | 0 | 10 |
| Total water content before coarse pulverization (%) | | 7 | 17 | 12 | 17 | 22 | 27 | 15 | 25 | 30 | 20 | 30 | 35 | 25 | 35 | 40 | 31 | 41 | 37 | 47 |
| Coarsely Pulverized Material | Specific volume | 5.4 | 4.7 | 5.0 | 4.5 | 3.9 | 3.4 | 4.4 | 3.6 | 3.2 | 2.9 | 2.7 | 2.4 | 2.0 | 2.3 | 2.1 | 2.0 | 1.9 | 1.7 | 1.5 |
| | Flakiness | X | Δ | X | O | ◉ | O | X | ◉ | O | X | O | O | X | O | O | X | O | X | O |
| | Crispness | — | X | — | O | ◉ | O | — | ◉ | O | — | O | O | — | O | O | — | O | — | X |
| | Dispesion | X | Δ | X | O | ◉ | O | X | ◉ | O | X | O | O | X | O | O | X | O | X | O |

Note:
1. The specific volume was determined by measuring a bulk volume per 100 g using a measuring cylinder, and calculating the volume rate with respect to that of raw rice.
2. The flakiness was determined as follows:
Uniform big size flakes O
Little small size flakes containing powder Δ
Flakes containing much powder X
These criteria correspond to the followings(a 30 mesh sieve is used):
Flakes 50% or more of which were removed X
Flakes 30 to 50% of which were removed Δ
Flakes 10 to 30% of which were removed O
Flakes 10% or less of which were removed ◉
3. The crispness was determined by ten panelists. The level of the crispness depends on the number of the panelists who thought the material was crispy as follows:
5 or less X
6 to 7 Δ
8 to 9 O
10 ◉
4. The dispersion was determined based on the condition of a sample when 100 g of the sample was introduced into 200 g of water.
Dispersed without aggregation ◉
At first, the sample aggregated, but when stirred for 10 sec. or less, the sample dispersed O
At first, the sample aggregated, but, when stirred for 10 to 30 sec., the sample dispersed Δ
At first, the sample aggregated, but, when stirred for 30 sec. or more, the sample dispersed X Table 1 shows that when the water content of the rice before puffing is controlled to 19 to 38 % and the amount of humidity to be added to the puffed rice is controlled to 5 to 15 %, the resultant material is good in flake property, crispness, and dispersion.

EXAMPLE 1

8 liters of water was sprayed to 100 Kg of unpolished rice and the wet rice was left to stand for 2 hours to make the rice sufficiently absorb water. Then, the rice was extruded at a start temperature of 130° C. to puff the rice. 6 liters of water was further sprayed to the puffed rice, and the rice was left to stand for 15 min. and then crushed by a flaker. After the pulverized rice was dried and put into a rice cooker, a seasoning and hot water were added to the cooker, which was left to stand while a cap was placed on the cooker. The resultant instant unpolished rice gruel was nice.

EXAMPLE 2

The crushed material produced in the same manner as Example 1 was added to "furikake" ( the furikake is a kind of processed food composed of pulverized cooked fish, toasted laver, etc., and is used to be spread on rice in order that the rice is ate without any special dishes) in an amount of 5 %. The resultant furikake was very nice.

EXAMPLE 3

10 liters of water was sprayed to 100 Kg of unmatured rice "shirata-mai", the rice was left to stand for one hour to make it sufficiently absorb water, and then the rice was extruded at a start temperature of 135° C. in order to puff the rice. 6 liters of water was further sprayed to the rice, the rice was left to stand for 15 min., and then the rice was crushed by a flaker. The resultant crushed material was dried and used for coating fried fish. The taste was plain and nice.

EXAMPLE 4

10 liters of water was sprayed 100 Kg of polished rice, the rice was left to stand for one hour to cause it to absorb water sufficiently, and then the wet rice was extruded at a starting temperature of 125° C. in order to puff the rice Further, 6 liters of water was sprayed to the puffed rice, the rice was left to stand for 15 min., and then the rice was crushed by a flaker. After the resultant material was dried, a seasoning and hot water were introduced into a rice cooker, and the cooker was left to stand for one minute with a cap placed on the cooker. As a result, nice instant porridge was obtained.

EXAMPLE 5

Sake was produced by the conventional process using Jozo Kyokai ( Brewage Association ) Yeast No. 7, except that 800 Kg of the crushed material obtained from Example 3, 200 Kg of "kome-koji" ( the kome-koji is composed of steamed rice on which Koki-mold is grown ), and 1700 liters of water were used. Elegant sake having an alcohol content of 20 % and a soluble solid of 1.5 % was obtained. The alcohol conversion rate was 380 liters / 1000 Kg-rice, and the residual lees rate was 5 % of rice. Thus, these values were very high yields.

EXAMPLE 6

Unrefined sake was produced by the conventional process using Jozo Kyokai Yeast No. 7, except that 800 Kg of the crushed material obtained from Example 3, 200 Kg of the komekoji, and 1400 liters of water were used. 2350 liters of the unrefined sake having an alcohol content of 20 % and a soluble solid of 6 % was obtained. 500 liters of rice vinegar was added to the unrefined sake for denaturation, and then the denatured unrefined sake was pressed and filtered to produce 2600 liters of the filtrate. The resultant filtrate was diluted with water to form 7100 liters of a feeding material for producing vinegar ( rice vinegar ) by an acetic acid-fermentaion. The taste of the products of rice vinegar was mild and nice.

EXAMPLE 7

100 Kg of wheat was partially polished by a rice polished to partially damage it. After 8 liters of water was sprayed to the partially damaged material and then the wet material was left to stand for one hour to cause the material to absorb water, the material was extruded at a start temperature of 140° C. to puff the material. Further, 4 liters of water was sprayed to the puffed material and left to stand for 15 min. Then, the material was crushed by a flaker. The resultant crushed material was dried, which was used as a feed material for soy sauce. The same amounts of the feed material and defatted soybeans were used and then the koji culture was made for this mixture. The resultant material was brewed by the conventional process to produce soy sauce. The aging was finished earlier than the conventional material by about one month. The resultant unrefined soy sauce having a total nitrogen content of 1.5 % was obtained. The lees rate of the present soy sauce was 10 %, which was about half of that of the conventional soy sauce. The taste of the resultant soy sauce was the same as that of the conventional one.

EXAMPLE 8

10 liters of water was sprayed to 100 Kg of barley ( polished ) and the wet barley was left to stand for one hour to make the barley sufficiently absorb water. The barley was then extruded at a start temperature of 140° C. to puff the barley, to which 4 liters of water was further sprayed and left to stand for 15 min. The resultant material was coarsely pulverized and dried, and then koji culture was made therefor. The resultant material was mixed with the same amount of soy beans and used as a feed for barley miso. The aging was finished earlier than that of the conventional process by two months. The sugar resolution rate was 83 %, which was higher by 3 % than the conventional one. The resultant miso was glossy and tasty.

EXAMPLE 9

100 Kg of corn ( round particle ) was converted into grits. 10 liters of water was sprayed to the grits and the wet grits was left to stand for two hours to cause the grits to sufficiently absorb water. The resultant material was extruded at a start temperature of 140° C. to puff the grits. 6 liters of water was further sprayed to the puffed grits, which was left to stand for 15 min., and then crushed by a flaker. After the crushed material ( flake ) was dried, it was used as a feed for whisky. The resultant flake was mixed with 25 Kg of malt and 650 liters of water to cause the saccharification, yeast was added to the saccharified flake, and then alcohol fermentation was performed by the conventional process. After the resultant material was distilled, 69 liters of the distilate ( whisky ) having an alcohol content of 57 % was obtained. The alcohol fermentation yield rate of the present process was higher by 7 % than the conventional process. In addition, the taste of the resultant whisky was mild.

EXAMPLE 10

100 Kg of foxtail millet was partially beated by a polisher and 10 liters of water was sprayed to thus partially damaged millet, which was left to stand for two hours in order to cause it to sufficienlty absorb water. The wet millet was extruded at a start temperature of 140° C. to puff the millet. 6 liters of water was sprayed to the puffed millet, which was left to stand for 15 min., and then was coarsely pulverized by a flaker. The resultant flake was dried and used as a feed for shochu ( spirits ). 70 Kg of the feed was mixed with 30 Kg of "genmai-koji" ( the genmai-koji is composed of unpolished rice on which koji-mold was proliferated.) ( black koji) and 160 liters of water and then the resultant mixture was subjected to the conventional alcohol fermentation. After the fermentation, the mixture was distilled by a pot-still to produce 135 liters of 25 % - shochu. The alcohol fermentation yield rate of the present invention was higher by 3 % than that of the conventional process, and its taste was mild.

EFFECT OF THE PRESENT INVENTION

The puffed and crushed grain obtained by puffing grain material whose water content is controlled to 40 % or less, adding a prescribed amount of water to the puffed grain, and then coarsely pulverizing the resultant material, is high in its flakiness crispness, dispersion and porosity, and has a good degree of gelatinization. Since the taste of this crushed material is light, there are many food applications. For example, the material eaten as it is, or as food such as instant gruel, furikake, etc. Further, it can be used for frying coating, confectionery, etc. In addition, the product obtained by the present invention has excellent properties as food for any kind of brewed products as obtained by using fermentation step, such as before-mentioned products in Example of the present invention, beer, shao-hsing rice wine, "mirin" ( a sweet sake used for seasoning ), etc. The present invention provides the product with good dispersion when the product is used as a feed, and increases the fermentation efficiency against nitrogen or sugar by 3 to 10 %.

In addition, according to the present invention, unedible grain such as shirota-mai, etc. which has not been used for food can be changed to good edible food, so that the present invention is very advantageous in respect of utilization of resources.

What is claimed is:

1. A process for producing pregelatinized grain comprising puffing said grain to convert the grain into food or material for producing other food, characterized by adjusting the water content of the grain before puffing to 19 to 38%, puffing the grain at 100° C. or higher, adding 5 to 15% of water to the puffed grain, and then coarsely pulverizing the puffed grain, thereby producing the coarsely pulverized porous material.

2. The process of claim 1, wherein the puffing is conducted by an extrusion puffing process.

3. The process of claim 1, wherein said grain is rice.

4. The process of claim 3, wherein said rice is shirotamai.

5. The process of claim 1, wherein said coarsely pulverized porous material is of a flake or grits form.

6. The process of claim 5, wherein said coarsely pulverized porous material is 0.1 to 0.5 cm in length and 0.5 cm or less in thickness.

* * * * *